(12) United States Patent
Watanabe et al.

(10) Patent No.: US 11,853,260 B2
(45) Date of Patent: Dec. 26, 2023

(54) DATA SEARCH SYSTEM AND DATA SEARCH METHOD

(71) Applicant: Hitachi, Ltd., Tokyo (JP)

(72) Inventors: Satoru Watanabe, Tokyo (JP); Yuichiro Aoki, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 17/692,993

(22) Filed: Mar. 11, 2022

(65) Prior Publication Data
US 2022/0358090 A1    Nov. 10, 2022

(30) Foreign Application Priority Data

May 7, 2021    (JP) .................................. 2021-079119

(51) Int. Cl.
*G06F 16/14*    (2019.01)
*G06F 16/13*    (2019.01)
*G06F 16/16*    (2019.01)

(52) U.S. Cl.
CPC .......... *G06F 16/152* (2019.01); *G06F 16/137* (2019.01); *G06F 16/144* (2019.01); *G06F 16/164* (2019.01)

(58) Field of Classification Search
CPC .... G06F 16/152; G06F 16/137; G06F 16/144; G06F 16/164
See application file for complete search history.

(56) References Cited

U.S. PATENT DOCUMENTS

| 11,308,102 | B2* | 4/2022 | Aikoh | G06N 5/025 |
| 11,308,158 | B2* | 4/2022 | Matsubara | G06F 16/7837 |
| 2008/0195664 | A1* | 8/2008 | Maharajh | G06Q 30/0244 |
| 2014/0193047 | A1* | 7/2014 | Grosz | G06Q 10/10 |
| | | | | 382/118 |
| 2014/0195921 | A1* | 7/2014 | Grosz | G06Q 30/0631 |
| | | | | 715/738 |

OTHER PUBLICATIONS

Xiao, Guohui, et al. "Virtual Knowledge graphs: an overview of systems and use cases." Data Intelligence 1.3 (Nov. 2019):201-223.

* cited by examiner

*Primary Examiner* — Angelica Ruiz
(74) *Attorney, Agent, or Firm* — Volpe Koenig

(57) ABSTRACT

A data search system includes an agent server that includes a storage and stores data in the storage, and a host server that manages tag management information in which a tag as a term for searching the data and a storage as a storage location of the data are associated with the data, receives a query including a search designation tag, and acquires data associated with the search designation tag from the storage location of the data by referring to the tag management information and responds to the query. The host server continuously updates the tag management information according to content and the storage location of the data.

8 Claims, 13 Drawing Sheets

| FILE NAME | FILE TAG | STORAGE |
|---|---|---|
| File1 | hospital,⋯ | S3-1 |
| File2 | hospital,⋯ | NFS1 |
| File3 | hospital,⋯ | S3-1 |

| FILE NAME | COLUMN NUMBER | COLUMN TAG | STORAGE |
|---|---|---|---|
| File1 | 1 | hospital,⋯ | S3-1 |
| File1 | 2 | disease,⋯ | S3-1 |
| File1 | 3 | patient,⋯ | S3-1 |

| STORAGE | AGENT NAME | IP ADDRESS | ID/Password | PORT NUMBER |
|---|---|---|---|---|
| S3-1 | Agent1 | 192.168.0.1 | Root/Admin | 5032 |
| NFS1 | Agent2 | 192.168.0.2 | Root/Admin | 5032 |
| S3-2 | Agent3 | 192.168.0.3 | Root/Admin | 5032 |
| ... | ... | ... | ... | ... |

| FILE NAME | COLUMN NUMBER | COLUMN TAG | STORAGE |
|---|---|---|---|
| File1 | 1 | hospital,⋯ | CACHE |
| File2 | 2 | hospital,⋯ | CACHE |
| File3 | 3 | hospital,⋯ | CACHE |

FIG. 7

| FILE NAME | STORAGE | LAST UPDATED DATE AND TIME | HASH VALUE |
|---|---|---|---|
| File1 | S3-1 | 2020-05-01, 12:00 | 0554FA65 |
| File2 | NFS1 | 2020-05-01, 13:00 | 12ABC458 |
| File3 | S3-1 | 2020-05-01, 14:00 | FF349832 |

FIG. 8

```
Patient_ID, Disease, Symptom, Emergency, ···
0001, COLD, COUGH, No, ···
0002, PNEUMONIA, FEVER, Yes, ···
0003, DIARRHEA, LANGUOR, No, ···
```

FIG. 9

```
Patient_ID, Disease
0001, COLD
0002, PNEUMONIA
0003, DIARRHEA
```

*FIG. 13*

1201 — SELECT patient_ID FROM fileTag:"DIAGNOSIS" WHERE columnTag:"DISEASE NAME" = "PNEUMONIA" USE_CACHE=NO STORE_CACHE = YES;

DATA SEARCH SYSTEM AND DATA SEARCH METHOD

BACKGROUND OF THE INVENTION

1. Field of the Invention

The present disclosure relates to a technology for accessing data stored in a computer system.

2. Description of the Related Art

A file system and a database system are widely used as a computer system that stores data. Both the file system and the database system are systems for accessing data from a terminal to read and write the data. In the file system and the database system, it is important to accurately find desired data. When data stored in a file or a database is read and a content thereof is confirmed, it is possible to reliably know whether or not the data is desired data, but efficiency is not good.

As a technology for efficiently finding the desired data, there is a technique called ontology-based data access (see Xiao, Guohui, et al. "Virtual knowledge graphs: An overview of systems and use cases." Data Intelligence 1.3 (2019): 201-223). The ontology-based data access is a technology in which ontology including a list of terms (hereinafter, referred to as "tags") and mapping between a tag and data are set in advance and data is accessed by using the tag.

For example, when a tag of "disease name" is defined in the ontology and mapping that associates the tag of "disease name" with data related to the term "disease name" is set, it is possible to find the data related to "disease name" even though the data is not read and the content is not confirmed.

SUMMARY OF THE INVENTION

However, in the ontology-based data access described in Xiao, Guohui, et al. "Virtual knowledge graphs: An overview of systems and use cases." Data Intelligence 1.3 (2019): 201-223, when a storage location of data is changed, desired data cannot be correctly found from the tag. Further, when the content of the data is updated, mismatch occurs between the tag of the mapping and actual data and the desired data cannot be correctly found by using the tag.

An object of the present disclosure is to provide a technology that enables desired data to be appropriately found by using a tag even though content or a storage location of the data is changed.

A data search system according to an aspect of the present disclosure includes an agent server that includes a storage and stores data in the storage, and a host server that manages tag management information in which a tag as a term for searching the data and a storage as a storage location of the data are associated with the data, receives a query including a search designation tag, and acquires data associated with the search designation tag from the storage location of the data by referring to the tag management information and responds to the query. The host server continuously updates the tag management information according to content and the storage location of the data.

According to an aspect of the present disclosure, since the tag associated with the data is updated according to the content and the storage location of the data, even though the content or the storage location of the data is changed, the desired data can be appropriately found by using the tag.

BRIEF DESCRIPTION OF THE DRAWINGS

FIG. 2 is a diagram illustrating an example of a file tag management table;

FIG. 3 is a diagram illustrating an example of a column tag management table;

FIG. 4 is a diagram illustrating an example of a storage management table;

FIG. 5 is a diagram illustrating an example of a cache management table;

FIG. 7 is a diagram illustrating an example of a data storage location management table;

FIG. 8 is a diagram illustrating an example of data stored in a storage;

FIG. 9 is a diagram illustrating an example of data stored in a tag data cache;

FIG. 13 is a diagram illustrating an example of a query received by a tag-based data search functional unit;

DESCRIPTION OF THE PREFERRED EMBODIMENTS

A mode for carrying out the invention will be described below.

Figure 1:
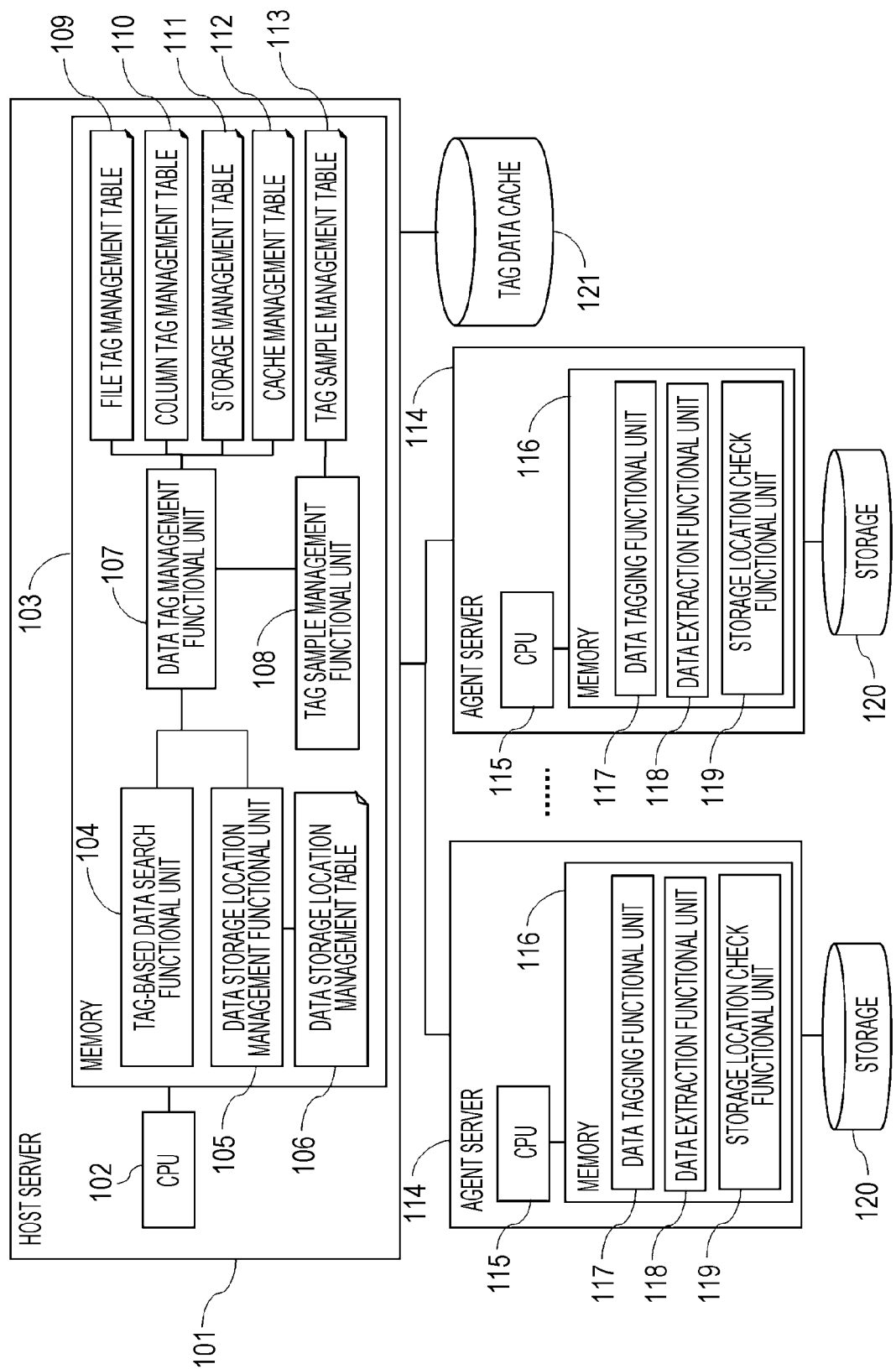
FIG. 1 is a block diagram of a data search system.

FIG. 1 is a block diagram of a data search system.

The data search system includes a host server 101, agent servers 114, storages 120, and a tag data cache 121.

The data search system is a system that performs tag-based data search. A tag is associated with data to be searched for. The data to be searched for is, for example, a file. The storage 120 is a storage device that stores the data to be searched for. The agent server 114 is a server device that extracts data stored in the storage 120 according to an instruction from the host server 101. The host server 101 is a server device that accepts a query including a tag from a user, instructs the agent server 114 to acquire data associated with the tag, and returns the data to the user. The tag data cache 121 is a memory that stores the searched result so as to be available for subsequent searches.

The host server 101 includes a CPU 102 and a memory 103. The memory stores software programs for realizing various functions and tables used for various functions. A tag-based data search functional unit 104, a data storage location management functional unit 105, a data tag management functional unit 107, and a tag sample management functional unit 108 are functional units realized by the software programs. The tables used for various functions include a data storage location management table 106, a file tag management table 109, a column tag management table 110, a storage management table 111, a cache management table 1123, and a tag sample management table 113. The CPU 102 is a processor that executes processing of the software programs by using these tables. The processing of each unit and the details of each table will be described later.

The agent server 114 includes a CPU 115 and a memory 116. The memory 116 stores software programs for realizing various functions. A data tagging functional unit 117, a data extraction functional unit 118, and a storage location check functional unit 119 are functional units realized by the software programs. The CPU 115 is a processor that executes processing of these software programs. Details of the processing of each unit will be described later.

In the present embodiment, the file has columns, and a tag can be associated with the entire file and each column. The tag associated with the file is a file tag. The tag associated with the column is a column tag.

FIG. 2 is a diagram illustrating an example of the file tag management table 109. In the file tag management table 109, an association among a file name of each file as a search target, a file tag associated with the file, and information for identifying a storage in which the file is stored is recorded.

FIG. 3 is a diagram illustrating an example of the column tag management table 110. In the column tag management table 110, an association among a file name of each file, a column number of a column included in the file, a column tag associated with the column, and information for identifying a storage in which the file is stored is recorded.

FIG. 4 is a diagram illustrating an example of the storage management table 111. In the storage management table 111, association among information for identifying each storage, an agent name of an agent in which an entity of the storage is disposed, an IP address for accessing the storage, an ID and a password for accessing the storage, and a port number for accessing the storage is recorded.

FIG. 5 is a diagram illustrating an example of the cache management table 112. Information for managing contents stored in the tag data cache 121 in which the search result is stored is recorded in the cache management table 112. In the cache management table 112, an association among a file name of a target file, a column number of a column included in the file, a column tag associated with the column, and storage information indicating that the file is stored in the cache is recorded.

Figure 6:
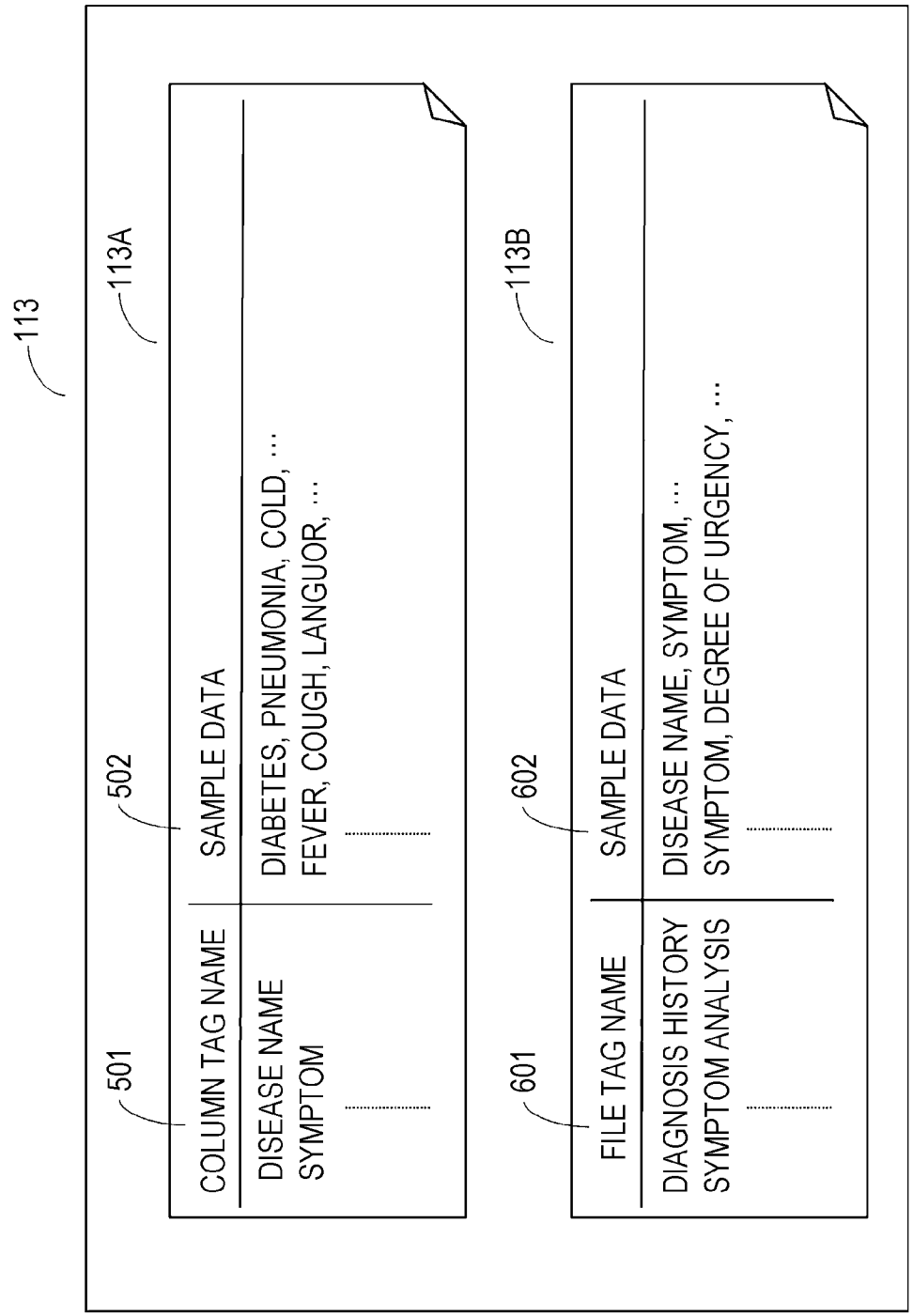
FIG. 6 is a diagram illustrating an example of a tag sample management table.

FIG. 6 is a diagram illustrating an example of the tag sample management table 113. The tag sample management table 113 is a table that associates a tag with data (sample data) to which the tag is given. The tag sample management table 113 includes a tag sample management table 113A related to a column tag and a tag sample management table 113B related to a file tag.

In the tag sample management table 113A, association between a column tag name 501 which is a name of a column tag and sample data 502 indicating data to which the column tag is given is recorded.

In the tag sample management table 113B, association between a file tag name 601 which is a name of a file tag and sample data 602 indicating data to which the file tag is given is recorded. The sample data 602 contains column names. When the column included in the file has the column name contained in the sample data 602, a file tag having the file tag name 601 is given to the file.

FIG. 7 is a diagram illustrating an example of the data storage location management table 106. The data storage location management table 106 is a table that manages a storage location of data. The storage location (storage) of the data (file) is not necessarily constant, and the file may move from a certain storage to another storage.

Although the storage in which the file is initially stored when the file tag is given is recorded in the file tag management table 109, when the storage location of the file is moved to another storage thereafter, information on a movement destination is recorded in the data storage location management table 106.

In the data storage location management table 106, an association between a file name of a moved file, information for identifying a storage which is a movement destination of the file, a last updated date and time indicating a date and time when the file is moved last and the storage location is moved, and a hash value of the file is recorded.

When the file moves, a content of the file may be rewritten and the content of the file may not be rewritten. When the content of the file is rewritten, there is a possibility that it is necessary to update the tag associated with the file. Thus, it is necessary to confirm whether or not the content of the file is rewritten. The hash value is used to check whether or not the content is rewritten when the file is moved.

FIG. 8 is a diagram illustrating an example of data stored in the storage 120. Data 801 is in a comma separated value (CSV) format. A first row of the data 801 contains column names, and second and subsequent rows contain values of the data. Patient_ID in the column is identification information for identifying each patient. Disease in the column is a disease name. Symptom of the column is a symptom. Emergency in the column is a degree of urgency. YES indicates a high degree of urgency, and NO indicates a low degree of urgency.

FIG. 9 is a diagram illustrating an example of data stored in the tag data cache 121. The data stored in the tag data cache 121 is a search result corresponding to a search query. Data 901 is in CSV format. A first row of the data 901 contains column names, and second and subsequent rows contain values of the data. In the example of FIG. 9, the data 901 includes a column of Patient_ID indicating identification information of the patient and a column of Disease indicating the disease name.

Figure 10:
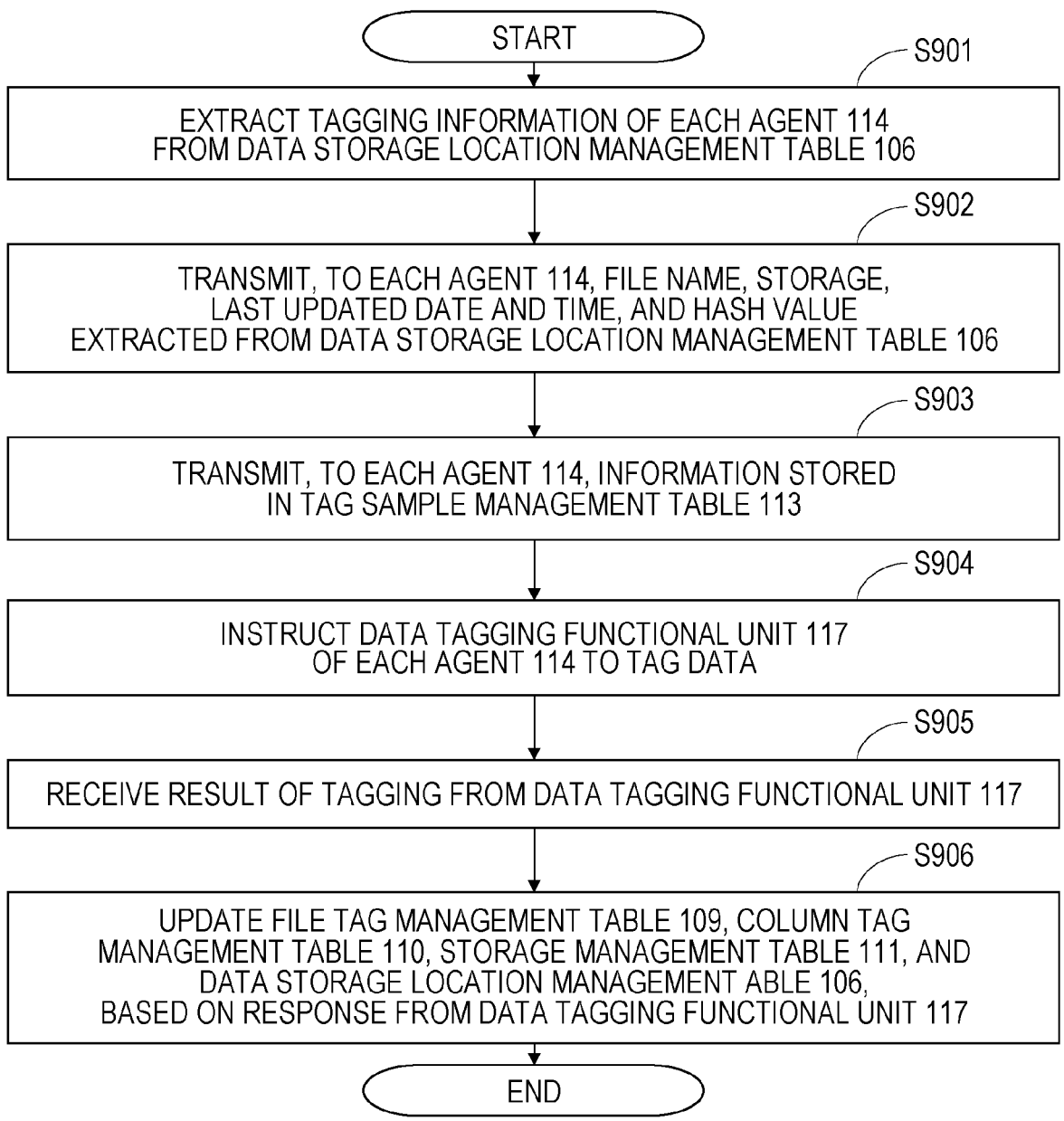
FIG. 10 is a flowchart of data tag management processing executed by a data tag management functional unit.

FIG. 10 is a flowchart of data tag management processing executed by the data tag management functional unit 107. The data tag management processing is processing of updating the tagging of data. The data tag management processing is periodically executed, for example, once a day.

In step S901, the data tag management functional unit 107 extracts information on the tagging in each agent server 114 from the data storage location management table 106.

In step S902, the data tag management functional unit 107 transmits, to each agent server 114, information on the file name, the storage, the last updated date and time, and the hash value extracted from the data storage location management table 106.

In step S903, the data tag management functional unit 107 transmits, to each agent server 114, the information stored in the tag sample management table 113.

In step S904, the data tag management functional unit 107 instructs the data tagging functional unit 117 of each agent server 114 to tag data (data tagging). Processing executed by the data tagging functional unit 117 which receives an instruction for data tagging will be described later.

In step S905, the data tag management functional unit 107 receives a result of the tagging from the data tagging functional unit 117.

In step S906, the data tag management functional unit 107 updates the file tag management table 109, the column tag management table 110, the storage management table 111, and the data storage location management table 106 based on the result of tagging received from the data tagging functional unit 117.

Figure 11:
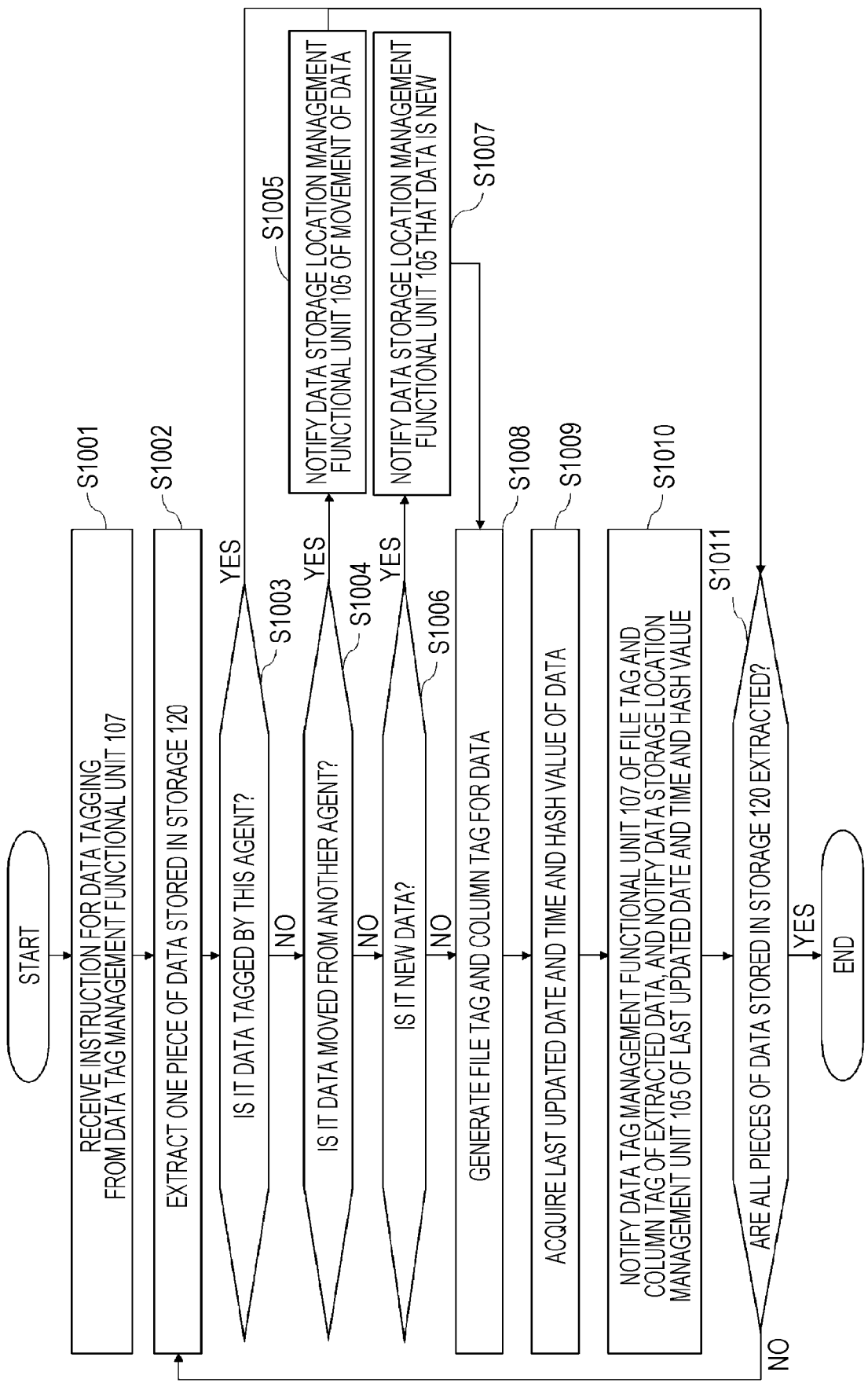
FIG. 11 is a flowchart of data tagging processing executed by a data tagging functional unit.

FIG. 11 is a flowchart of data tagging processing executed by the data tagging functional unit 117. The data tagging processing is processing of tagging data.

In step S1001, the data tagging functional unit 117 receives the instruction for data tagging from the data tag management functional unit 107.

In step S1002, the data tagging functional unit 117 extracts one piece of data stored in the storage 120.

In step S1003, the data tagging functional unit 117 determines whether or not the extracted data is data tagged by the agent server 114. When the data is tagged by the agent server 114, the data tagging functional unit 117 proceeds to step S1011.

When the data is not tagged by the agent server 114, in step S1004, the data tagging functional unit 117 determines whether or not the data is data moved from another agent. The movement mentioned herein means that the data itself is not changed and the storage location is changed simply. Whether or not the data is data moved from another agent can be determined based on whether the hash value of the data matches the hash value extracted from the data storage location management table 106. Processing of determining whether or not the data is data moved from another agent (movement determination processing) will be described later.

When the data is data moved from another agent, the data tagging functional unit 117 notifies the data storage location management functional unit 105 of the movement of the data in step S1005. The data storage location management functional unit 105 that receives the notification of the movement of the data updates the data storage location management table 106 according to the notification. After step S1005, the data tagging functional unit 117 proceeds to step S1011.

When the data is not data moved from another agent, in step S1006, the data tagging functional unit 117 determines whether or not the data is new data. When the data is new data, in step S1007, the data tagging functional unit 117 notifies the data storage location management functional unit 105 that the data is new data. The data storage location management functional unit 105 that receives the notification that the data is new data adds information to the data storage location management table 106 according to the notification.

When the data is not new data or after step S1007, the data tagging functional unit 117 generates a file tag and a column tag for the data in step S1008. Processing of generating the file tag and the column tag (tag generation processing) will be described later.

In step S1009, the data tagging functional unit 117 acquires the last updated date and time and the hash value of the data.

In step S1010, the data tagging functional unit 117 notifies the data tag management functional unit 107 of the file tag and the column tag generated in step S1008, and notifies the data storage location management functional unit 105 of the last updated date and time and the hash value acquired in step S1009.

The data tag management functional unit 107 that receives the notification of the file tag and the column tag updates the file tag management table 109 and the column tag management table 110 according to the notification. The data storage location management functional unit 105 that receives the notification of the last updated date and time and the hash value updates the data storage location management table 106 according to the notification.

In step S1011, the data tagging functional unit 117 determines whether or not all the pieces of data stored in the storage 120 are extracted. When there is data that is not extracted, the data tagging functional unit 117 returns to step S1002. When all the pieces of data are extracted, the data tagging functional unit 117 completes a series of processing.

Figure 12:
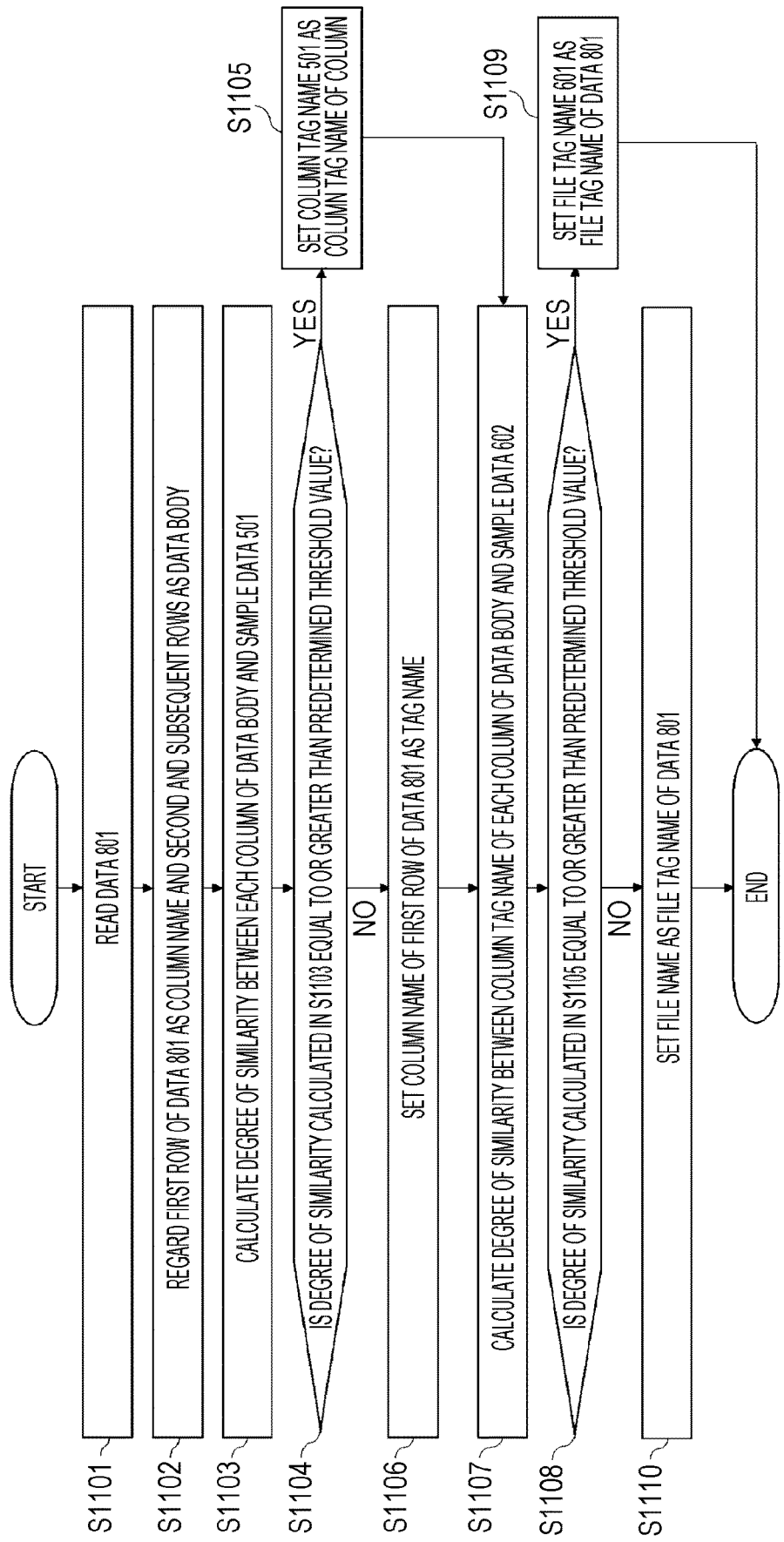
FIG. 12 is a flowchart of tag generation processing executed by the data tagging functional unit.

FIG. 12 is a flowchart of tag generation processing executed by the data tagging functional unit 117. The tag generation processing is processing corresponding to step S1008 described above, and FIG. 12 illustrates the detailed processing.

In step S1101, the data tagging functional unit 117 reads the data 801. In step S1102, a first row of the data 801 is regarded as a column name, and second and subsequent rows are regarded as a data body. In step S1103, the data tagging functional unit 117 calculates a degree of similarity between each column of the data body and the sample data 502 of each row of the tag sample management table 113A. For example, the number of same words included can be used as the degree of similarity.

In step S1104, the data tagging functional unit 117 determines whether or not the degree of similarity calculated in the processing in step S1103 is equal to or greater than a predetermined threshold value. When the degree of similarity is equal to or greater than the threshold value, in step S1105, the data tagging functional unit 117 sets, as the column tag name of the column of the data 801, the column tag name 501 corresponding to the sample data 502 of which the degree of similarity in the tag sample management table 113A is equal to or greater than the threshold value. When the degree of similarity is smaller than the threshold value, in step S1106, the data tagging functional unit 117 sets, as the column tag name of each column, the column name of each column in the first row of the data 801.

In step S1107, the data tagging functional unit 117 calculates the degree of similarity between the tag name of each column of the data body of the data 801 and the sample data 602 of each row of the tag sample management table 113B. For example, the number of same words included can be used as the degree of similarity.

In step S1108, the data tagging functional unit 117 determines whether the degree of similarity calculated in the processing in step S1107 is equal to or greater than a predetermined threshold value. When the similarity is equal to or greater than the threshold, in step S1109, the data tagging functional unit 117 sets, as the file tag name of the data 801, the file tag name 601 corresponding to the sample data 602 of which the degree of similarity in the tag sample management table 113B is equal to or greater than the threshold value. When the degree of similarity is smaller than the threshold value, in step S1110, the data tagging functional unit 117 sets the file name of the data 801 as the file tag name of the data 801.

FIG. 13 is a diagram illustrating an example of a query received by the tag-based data search functional unit 104. A query 1201 is a query that retrieves data associated with "diagnosis" of a patient with "disease name" being "pneumonia". USE_CACHE is designation as to whether or not to use data of a cache for search. STORE_CACHE is designation as to whether or not to store the search result in the cache. In the query 1201, it is designated that the data stored in the tag data cache 121 is not used for the search by the query, and the result of the search by the query is stored in the tag data cache 121.

Figure 14:
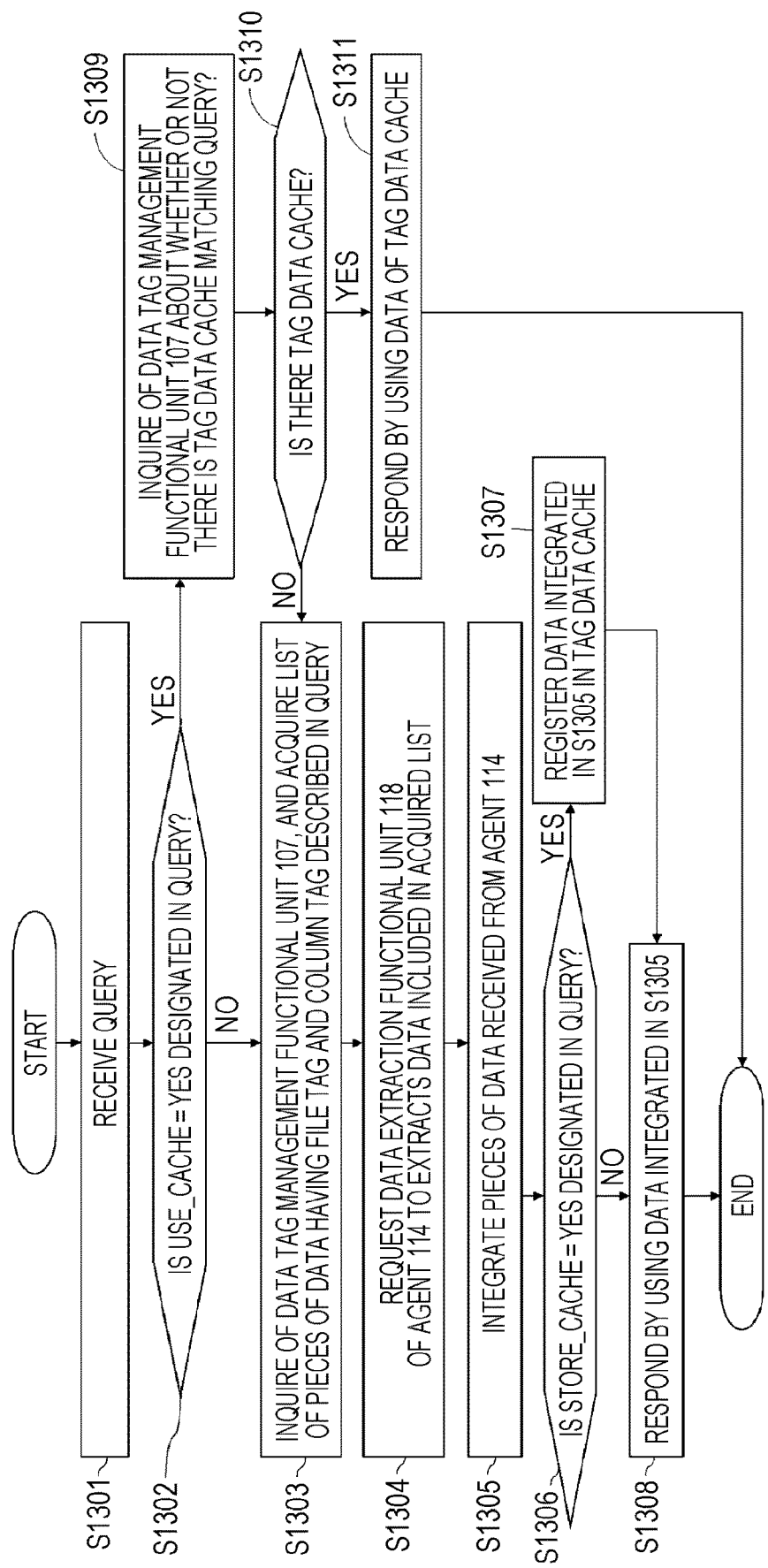
FIG. 14 is a flowchart of tag-based search processing executed by the tag-based data search functional unit.

FIG. 14 is a flowchart of tag-based search processing executed by the tag-based data search functional unit 104.

When the query is received in step S1301, the tag-based data search functional unit 104 determines whether or not USE_CACHE=YES is designated in the query in step S1302. When USE_CACHE=YES is designated, in step S1309, the tag-based data search functional unit 104 inquires of the data tag management functional unit 107 about whether or not data matching the query is present in the tag data cache 121. In step S1310, the tag-based data search functional unit 104 determines whether or not data matching the query is present in the tag data cache 121.

When the data matching the query is present in the tag data cache 121, in step S1311, the tag-based data search functional unit 104 responds to the query by the data from the tag data cache 121. When the data matching the query is not present in the tag data cache 121, in step S1303, the tag-based data search functional unit 104 inquires of the data tag management functional unit 107 and acquires a list of pieces of data having the file tag and the column tag described in the query.

In step S1304, the tag-based data search functional unit 104 requests that the data extraction functional unit 118 of the agent server 114 including the storage 120 in which the pieces of data included in the acquired list are stored extracts the data.

In the agent server 114, the data extraction functional unit 118 extracts data requested to be extracted from the storage 120 and transmits the data to the tag-based data search functional unit 104 of the host server 101.

Since the pieces of data included in the list are received from the agent server 114, the tag-based data search functional unit 104 integrates the pieces of data received from the agent server 114 in step S1305. The integration is, for example, to connect the pieces of data included in the list to unified data. This integrated data is the search result.

In step S1306, the tag-based data search functional unit 104 determines whether or not STORE_CACHE=YES is designated in the query. When STORE_CACHE=YES is designated in the query, the tag-based data search functional unit 104 registers the data integrated in the processing of step S1305 in the tag data cache 121 in step S1307.

When STORE_CACHE=YES is not designated in the query or the integrated data is registered in the tag data cache 121, the tag-based data search functional unit 104 responds to the query, in step S1308, by using the data integrated in the processing of step S1305.

Figure 15:
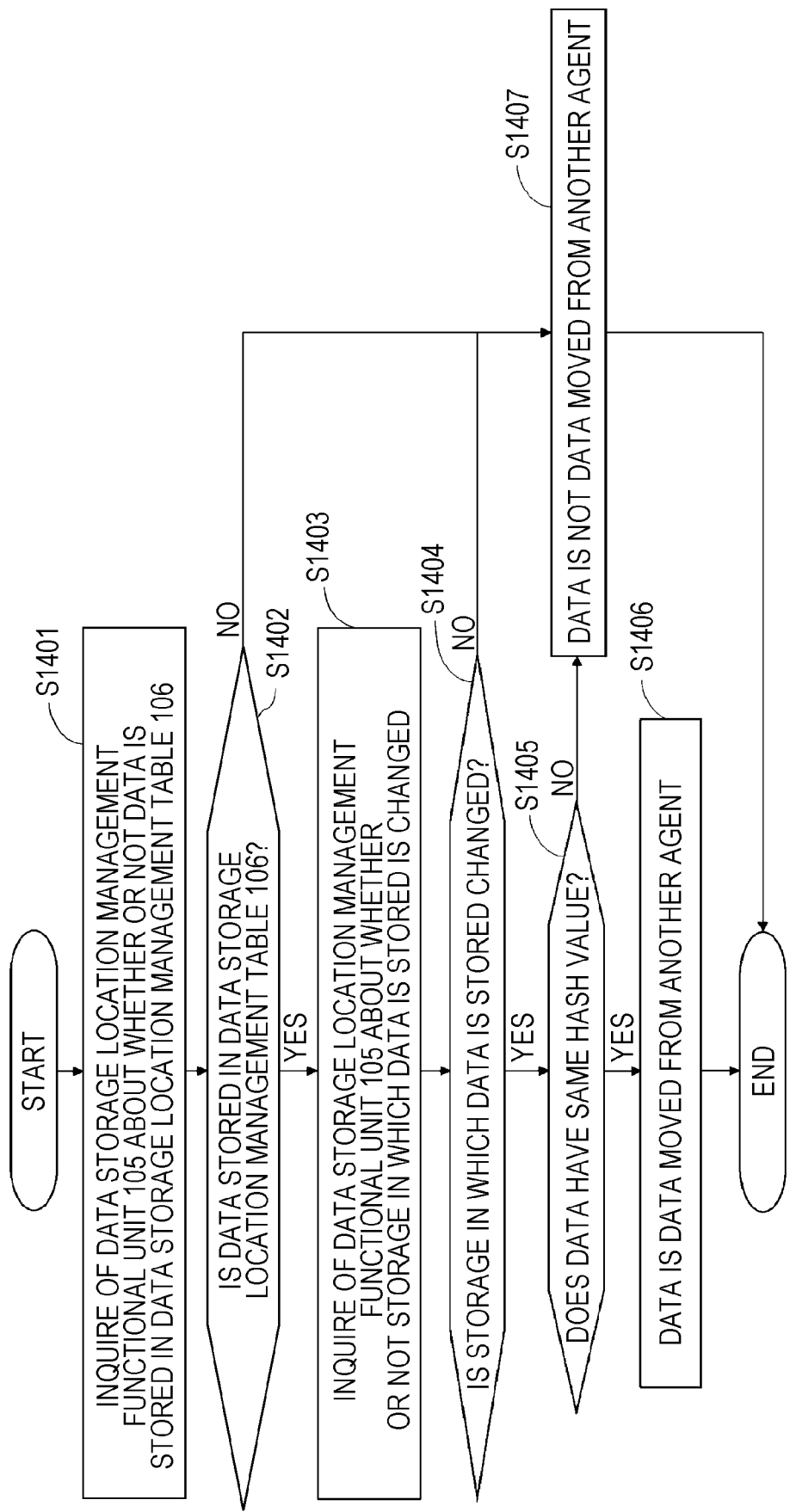
FIG. 15 is a flowchart of movement determination processing executed by the data tagging functional unit.

FIG. 15 is a flowchart of movement determination processing executed by the data tagging functional unit 117. The movement determination processing is processing corresponding to step S1004 described above, and the detailed processing thereof is illustrated in FIG. 14.

In step S1401, the data tagging functional unit 117 inquires of the data storage location management functional unit 105 about whether or not the data is stored in the data storage location management table 106. In step S1402, the data tagging functional unit 117 determines whether or not the data is stored in the data storage location management table 106.

When the data is stored in the data storage location management table 106, in step S1403, the data tagging functional unit 117 inquires of the data storage location management functional unit 105 about whether or not the storage in which the data is stored is changed. In step S1404, the data tagging functional unit 117 determines whether or not the storage in which the data is stored is changed.

When the storage in which the data is stored is changed, in step S1405, the data tagging functional unit 117 determines whether or not the data has the same hash value as the has value before the change.

When it is determined in the determination in step S1402 that the data is not stored in the data storage location management table 106, when it is determined in the determination in step S1404 that the storage in which the data is stored is not changed, and when it is determined in the determination in step S1405 that the data does not have the same hash value as the hash value before the change, the data tagging functional unit 117 specifies, in step S1407, that the data is not data simply moved from another agent server 114.

When it is determined in the determination of step S1405 that the data has the same hash value as the hash value before the change, the data tagging functional unit 117 specifies in step S1406 that the data is data simply moved from another agent server 114.

Figure 16:
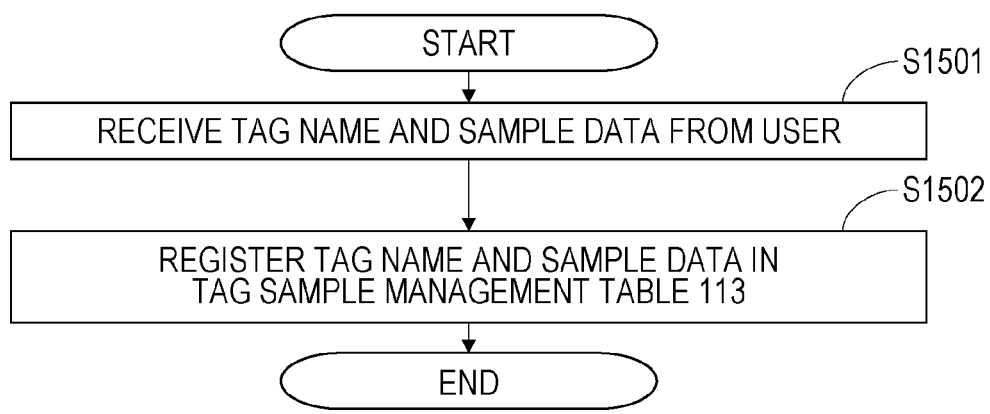
FIG. 16 is a flowchart of tag sample registration processing executed by a tag sample management functional unit.

FIG. 16 is a flowchart of tag sample registration processing executed by the tag sample management functional unit 108. The tag sample registration processing is processing of registering a tag sample in the tag sample management table 113. The tag sample registration processing is processing common to both the column tag and the file tag.

In step S1501, the tag sample management functional unit 108 receives the tag name of the tag sample and the sample data from the user. In step S1502, the tag sample management functional unit 108 registers the received tag name and sample data in the tag sample management table 113.

The above-described embodiments are examples for describing the present invention, and are not intended to limit the scope of the present invention to the embodiments. Those skilled in the art can implement the present invention in various other aspects without departing from the scope of the present invention.

The embodiments herein include the following items. However, items included in the embodiments are not limited only to the items described below.

(Item 1)

A data search system including: an agent server that includes a storage and stores data in the storage; and a host server that manages tag management information in which a tag as a term for searching the data and a storage as a storage location of the data are associated with the data, receives a query including a search designation tag, and acquires data associated with the search designation tag from the storage location of the data by referring to the tag management information and responds to the query. The host server continuously updates the tag management information according to content and the storage location of the data.

Accordingly, since the tag associated with the data is updated according to the content and the storage location of the data, the desired data can be appropriately found by using the tag even though the content or the storage location of the data is changed.

(Item 2)

Data search system according to item 1, in which the host server sends, to the agent server, a request for tagging of the data stored in the storage, the agent server receives the request, determines a tag to be associated with the data stored in the storage, and sends a notification to the host server, and the host server receives the notification and updates the tag management information.

Accordingly, since each agent server performs tagging of each data, a processing load of the tagging can be distributed.

(Item 3)

The data search system according to item 2, in which the agent server notifies the host server that the data is moved when the data stored in the storage is data moved from another agent server without changing the content, and generates a tag to be associated with the data and notifies the host server of the tag when the data stored in the storage is not the data moved from another agent without changing the content.

Accordingly, in the configuration in which the tagging processing is distributed to the agent servers, since the tagging processing is not performed on the data simply moved between the agent servers, a load of the tagging processing can be reduced.

(Item 4)

The data search system according to item 3, in which the host server further manages a hash value of the data, and transmits the hash value to the agent server when the tagging is requested, and the agent server calculates a hash value for data to which a tag is not given by the agent server, and determines that the data is data moved from another agent server without changing the content when the hash value matches a hash value received from the host server.

Accordingly, since the matching of the data is confirmed by using the hash value, it is possible to easily and reliably confirm that the content of the data is not changed.

(Item 5)

The data search system according to item 4, in which the agent server transmits the hash value to the host server when it is determined that the data is the data moved from another agent server without changing the content, and the host server manages the hash value received from the agent server.

Accordingly, since the host server does not calculate the hash value by the host server itself but acquires and manages the hash value generated by the agent server, the host server does not need to bear a load from the calculation processing of the hash value.

(Item 6)

The data search system according to item 2, in which a tag and sample data including one or more words related to the tag are associated in advance, and the agent server associates the tag associated with the sample data with the data when a degree of similarity between the data and the sample data is equal to or greater than a predetermined threshold value.

Accordingly, since the tag can be given to the data without a manual operation, it is easy to continuously update the tag.

(Item 7)

The data search system according to item 6, in which the data is a file, the file includes one or more columns and column names, first tag sample management information in which a file tag as a tag to be given to a file and sample data including one or more words related to the file tag are associated and second tag sample management information in which a column tag as a tag to be given to a column and sample data including one or more words related to the column tag are associated are set in advance, and the agent server calculates a degree of similarity between each of the columns included in the file and the sample data of the second tag sample management information, and gives a column tag associated with the sample data to the column when there are a column and sample data between which the degree of similarity is equal to or greater than a threshold value, and calculates a degree of similarity between each of the column names included in the file and the sample data of the first tag sample management information, and gives a file tag associated with the sample data to the file when there is sample data of which the degree of similarity with the file is equal to or greater than a threshold value.

Accordingly, since the file tag and the column tag can be given to the data without a manual operation, it is easy to continuously update the file tag and the column tag.

(Item 8)

The data search system according to item 1, in which the host server updates the tag management information for each constant time.

Accordingly, it is possible to maintain a state where the desired data can be appropriately found by using the tag.

What is claimed is:

1. A data search system comprising:
    an agent server that includes a storage and stores data in the storage; and
    a host server that is communicatively coupled to the agent sever and manages tag management information in which a tag as a term for searching the data
    wherein the host server is configured to:
    receive a query including a search designation tag,
    acquire search data associated with the search designation tag by referring to the tag management information, and
    respond to the query with the search data associated with the search designation tag,
    wherein the agent server is configured to:
    receive, from the host server, a request for tagging of the data stored in the storage of the agent server,
    receive, from the host server, sample data,
    determine a tag for data stored in a storage of the agent server by comparing the data stored in the storage of the agent server to the sample data, and
    update the tag management information by sending a notification to the host server.

2. The data search system according to claim 1, wherein the agent server is further configured to:
    notify the host server that the data is moved on a condition that the data stored in the storage is data moved from another agent server without changing the data.

3. The data search system according to claim 2, wherein the host server is further configured to:
    manage a hash value of the data, and transmits the hash value to the agent server upon request of the tagging, and
    the agent server calculates a hash value for data to which a tag is not given by the agent server, and determines that the data is data moved from another agent server without changing the data on a condition that the hash value matches a hash value received from the host server.

4. The data search system according to claim 3, wherein the agent server is further configured to:
    transmit the hash value to the host server upon a determination that the data is the data moved from another agent server without changing the data, and
    wherein the host server manages the hash value received from the agent server.

5. The data search system according to claim 1, wherein the tag for the data stored in the storage of the agent server is determined on a condition that a degree of similarity between the data and the sample data is equal to or greater than a predetermined threshold value.

6. The data search system according to claim 1, wherein the data is a file that includes one or more columns and column names,
  wherein the agent server is further configured to:
    calculate a degree of similarity between each of the columns included in the file and the sample data,
    assign a column tag associated with the sample data to the column when on a condition that there are a column and the sample data between which the degree of similarity is equal to or greater than a first threshold value,
    calculate a degree of similarity between each of the column names included in the file and the sample data, and
    assign a file tag associated with the sample data to the file on a condition that there is the sample data of which the degree of similarity with the file is equal to or greater than a second threshold value.

7. The data search system according to claim 1, wherein the host server updates the tag management information for each constant time.

8. A data search method in a computer system, the method comprising:
  receiving, by an agent server, a request for tagging of data stored in a storage of the agent server from a host server;
  receiving, by the agent server, sample data from the host server;
  determining, by the agent server, a tag for the data stored in the storage of the agent server by comparing the data to the sample data, and
  updating, by the agent server, tag management information stored in the host server by sending a notification to the host server, wherein the host server uses the tag management information to respond to search queries.

* * * * *